(12) United States Patent
Alapuranen (10) Patent No.: US 6,687,259 B2
(45) Date of Patent: Feb. 3, 2004

(54) ARQ MAC FOR AD-HOC COMMUNICATION NETWORKS AND A METHOD FOR USING THE SAME

(75) Inventor: Pertti O. Alapuranen, Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 10/375,013

(22) Filed: Feb. 28, 2003

(65) Prior Publication Data

US 2003/0227935 A1 Dec. 11, 2003

Related U.S. Application Data
(60) Provisional application No. 60/385,574, filed on Jun. 5, 2002.

(51) Int. Cl.[7] ................................................. H04J 3/16
(52) U.S. Cl. ....................................... 370/437; 370/447
(58) Field of Search ................................ 370/347, 348, 370/443, 442, 431, 445, 437, 447, 448, 450, 329, 330, 341

(56) References Cited

U.S. PATENT DOCUMENTS

| | | | |
|---|---|---|---|
| 4,494,192 A | 1/1985 | Lew et al. .................. | 364/200 |
| 4,617,656 A | 10/1986 | Kobayashi et al. ........... | 370/74 |

(List continued on next page.)

FOREIGN PATENT DOCUMENTS

| | | |
|---|---|---|
| CA | 2132180 | 3/1996 |
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Phil Karn, "MACA–A New Channel Access Method For Packet Radio".

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

(List continued on next page.)

*Primary Examiner*—Ajit Patel
*Assistant Examiner*—Chirag Shah
(74) *Attorney, Agent, or Firm*—Roylance, Abrams, Berdo & Goodman, L.L.P.; Joseph J. Buczynski (57) ABSTRACT

A system and method for a media access control (MAC) algorithm with separate operation modes for good channel and bad channel communication. Variables, including channel vector values transmitted in request-to-send/clear-to-send (RTS/CTS) messages, are varied depending on channel mode, resulting in optimized system throughput. In a first mode, the present invention provides a system and method to estimate a channel vector length, and communicate the length to a first node and any associated groups of nodes receiving the RTS/CTS sequence. In a second mode, a maximum channel vector length is used, as retransmissions are less probable in good channels.

36 Claims, 6 Drawing Sheets

U.S. PATENT DOCUMENTS

| | | | | |
|---|---|---|---|---|
| 4,726,027 A | * | 2/1988 | Nakamura et al. | 714/748 |
| 4,736,371 A | * | 4/1988 | Tejima et al. | 370/236 |
| 4,742,357 A | | 5/1988 | Rackley | 342/457 |
| 4,747,130 A | | 5/1988 | Ho | 379/269 |
| 4,910,521 A | | 3/1990 | Mellon | 342/45 |
| 5,034,961 A | | 7/1991 | Adams | 375/130 |
| 5,068,916 A | | 11/1991 | Harrison et al. | 455/39 |
| 5,231,634 A | * | 7/1993 | Giles et al. | 370/348 |
| 5,233,604 A | | 8/1993 | Ahmadi et al. | 370/60 |
| 5,241,542 A | | 8/1993 | Natarajan et al. | 370/95.3 |
| 5,317,566 A | | 5/1994 | Joshi | 370/60 |
| 5,392,450 A | | 2/1995 | Nossen | 455/12.1 |
| 5,412,654 A | | 5/1995 | Perkins | 370/94.1 |
| 5,424,747 A | | 6/1995 | Chazelas et al. | 342/70 |
| 5,502,722 A | * | 3/1996 | Fulghum | 370/343 |
| 5,517,491 A | | 5/1996 | Nanni et al. | 370/29 |
| 5,555,425 A | | 9/1996 | Zeller et al. | 395/800 |
| 5,555,540 A | | 9/1996 | Radke | 370/16.1 |
| 5,572,528 A | | 11/1996 | Shuen | 370/85.13 |
| 5,615,212 A | | 3/1997 | Ruszczyk et al. | 370/433 |
| 5,618,045 A | | 4/1997 | Kagan et al. | 463/40 |
| 5,621,732 A | | 4/1997 | Osawa | 370/79 |
| 5,623,495 A | | 4/1997 | Eng et al. | 370/397 |
| 5,627,976 A | | 5/1997 | McFarland et al. | 395/308 |
| 5,629,948 A | | 5/1997 | Hagiwara et al. | 371/32 |
| 5,631,897 A | | 5/1997 | Pacheco et al. | 370/237 |
| 5,644,576 A | | 7/1997 | Bauchot et al. | 370/437 |
| 5,652,751 A | | 7/1997 | Sharony | 370/227 |
| 5,680,392 A | | 10/1997 | Semaan | 370/261 |
| 5,684,794 A | | 11/1997 | Lopez et al. | 370/337 |
| 5,687,194 A | | 11/1997 | Paneth et al. | 375/283 |
| 5,696,903 A | | 12/1997 | Mahany | 395/200.58 |
| 5,701,294 A | | 12/1997 | Ward et al. | 370/252 |
| 5,706,428 A | | 1/1998 | Boer et al. | 395/200 |
| 5,717,689 A | | 2/1998 | Ayanoglu | 370/349 |
| 5,745,483 A | | 4/1998 | Nakagawa et al. | 370/335 |
| 5,774,876 A | | 6/1998 | Woolley et al. | 705/28 |
| 5,781,540 A | | 7/1998 | Malcolm et al. | 370/321 |
| 5,784,362 A | | 7/1998 | Turina | 370/321 |
| 5,787,080 A | | 7/1998 | Hulyalkar et al. | 370/348 |
| 5,794,154 A | | 8/1998 | Bar-On et al. | 455/509 |
| 5,796,732 A | | 8/1998 | Mazzola et al. | 370/362 |
| 5,796,741 A | | 8/1998 | Saito et al. | 370/439 |
| 5,805,593 A | | 9/1998 | Busche | 370/396 |
| 5,805,842 A | | 9/1998 | Nagaraj et al. | 395/306 |
| 5,805,977 A | | 9/1998 | Hill et al. | 455/31.3 |
| 5,809,518 A | | 9/1998 | Lee | 711/115 |
| 5,822,309 A | | 10/1998 | Ayanoglu et al. | 370/315 |
| 5,844,905 A | * | 12/1998 | McKay et al. | 370/443 |
| 5,845,097 A | | 12/1998 | Kang et al. | 395/297 |
| 5,857,084 A | | 1/1999 | Klein | 395/309 |
| 5,870,350 A | | 2/1999 | Bertin et al. | 365/233 |
| 5,877,724 A | | 3/1999 | Davis | 342/357 |
| 5,881,095 A | | 3/1999 | Cadd | 375/202 |
| 5,881,372 A | | 3/1999 | Kruys | 455/113 |
| 5,886,992 A | | 3/1999 | Raatikainen et al. | 370/410 |
| 5,896,561 A | | 4/1999 | Schrader et al. | 455/67.1 |
| 5,903,559 A | | 5/1999 | Acharya et al. | 370/355 |
| 5,909,651 A | | 6/1999 | Chander et al. | 455/466 |
| 5,936,953 A | | 8/1999 | Simmons | 370/364 |
| 5,943,322 A | | 8/1999 | Mayor et al. | 370/280 |
| 5,987,011 A | | 11/1999 | Toh | 370/331 |
| 5,987,033 A | | 11/1999 | Boer et al. | 370/445 |
| 5,991,279 A | | 11/1999 | Haugli et al. | 370/311 |
| 6,028,853 A | | 2/2000 | Haartsen | 370/338 |
| 6,029,217 A | | 2/2000 | Arimilli et al. | 710/107 |
| 6,034,542 A | | 3/2000 | Ridgeway | 326/39 |
| 6,044,062 A | | 3/2000 | Brownrigg et al. | 370/238 |
| 6,047,330 A | | 4/2000 | Stracke, Jr. | 709/238 |
| 6,052,594 A | | 4/2000 | Chuang et al. | 455/450 |
| 6,052,752 A | | 4/2000 | Kwon | 710/126 |
| 6,064,626 A | | 5/2000 | Stevens | 365/233 |
| 6,067,291 A | | 5/2000 | Kamerman et al. | 370/338 |
| 6,078,566 A | | 6/2000 | Kikinis | 370/286 |
| 6,104,712 A | | 8/2000 | Robert et al. | 370/389 |
| 6,108,738 A | | 8/2000 | Chambers et al. | 710/113 |
| 6,115,580 A | | 9/2000 | Chuprun et al. | 455/1 |
| 6,122,690 A | | 9/2000 | Nannetti et al. | 710/102 |
| 6,130,881 A | | 10/2000 | Stiller et al. | 370/238 |
| 6,130,892 A | | 10/2000 | Short et al. | 370/401 |
| 6,132,306 A | | 10/2000 | Trompower | 453/11.1 |
| 6,163,699 A | | 12/2000 | Naor et al. | 455/453 |
| 6,178,337 B1 | | 1/2001 | Spartz et al. | 455/561 |
| 6,192,053 B1 | | 2/2001 | Angelico et al. | 370/448 |
| 6,192,230 B1 | | 2/2001 | Van Bokhorst et al. | 455/343 |
| 6,208,870 B1 | | 3/2001 | Lorello et al. | 455/466 |
| 6,223,240 B1 | | 4/2001 | Odenwald et al. | 710/129 |
| 6,240,294 B1 | | 5/2001 | Hamilton et al. | 455/456 |
| 6,246,875 B1 | | 6/2001 | Seazholtz et al. | 455/432 |
| 6,249,516 B1 | | 6/2001 | Brownrigg et al. | 370/338 |
| 6,275,707 B1 | | 8/2001 | Reed et al. | 455/456 |
| 6,285,892 B1 | | 9/2001 | Hulyalkar | 455/574 |
| 6,304,556 B1 | | 10/2001 | Haas | 370/254 |
| 6,327,300 B1 | | 12/2001 | Souissi et al. | 375/219 |
| 6,349,091 B1 | | 2/2002 | Li | 370/238 |
| 6,349,210 B1 | * | 2/2002 | Li | 455/450 |
| 6,404,756 B1 | * | 6/2002 | Whitehill et al. | 370/338 |
| 2001/0053699 A1 | | 12/2001 | McCrady et al. | 455/513 |
| 2002/0110105 A1 | * | 8/2002 | Awater et al. | 370/338 |
| 2002/0191573 A1 | * | 12/2002 | Whitehill et al. | 370/338 |
| 2003/0128681 A1 | * | 7/2003 | Rauschmayer | 370/338 |
| 2003/0157951 A1 | * | 8/2003 | Hasty | 455/519 |

OTHER PUBLICATIONS

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih–Chun Hu and Jorjeta Jetcheva, "A Performance Comparison of Multi–Hop Wireless Ad Hoc Network Routing Protocols", Oct. 25–30, 1998, Proceedings of the $4^{th}$ Annual ACM/IEEE International Conference on Mobile Computing and Networking.

C. David Young, "USAP: A Unifying Dynamic Distributed Multichannel TDMA Slot Assignment Protocol".

Chip Elliott and Bob Helie, "Self–Organizing, Self–Healing Wireless Networks", 2000 IEEE.

J.J. Garcia–Luna–Aceves and Asimakis Tzamaloukas, "Reversing the Collision–Avoidance Handshake in Wireless Networks".

J.J. Garcia–Luna–Aceves and Marcelo Spohn, "Transmission–Efficient Routing in Wireless Networks Using Link–State Information".

J.J. Garcia–Luna–Aceves and Ewerton L. Madruga, "The Core–Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustment".

Ram Ramanathan and Martha E. Steenstrup, "Hierarchically–Organized, Multihop Mobile Wireless Networks for Quality–of–Service Support".

Zhenyu Tang and J.J. Garcia–Luna–Aceves, "Collision––Avoidance Transmission Scheduling for Ad–Hoc Networks".

George Vardakas and Wendell Kishaba, "Qos Networking With Adaptive Link Control and Tactical Multi–Channel Software Radios".

* cited by examiner

FIGURE 4B transmission and
retransmission
(to iap)
length of channel
vector 2

FIGURE 4C

ACK (to node)

ARQ MAC FOR AD-HOC COMMUNICATION NETWORKS AND A METHOD FOR USING THE SAME

This application claims benefit under 35 U.S.C. §119(e) from U.S. provisional patent application serial No. 60/385,574 entitled "ARQ MAC For Ad-Hoc Communication Networks And A Method For Using The Same", filed Jun. 5, 2002, the entire contents of which is incorporated herein by reference.

BACKGROUND OF THE INVENTION

1. Field of the Invention

The present invention relates to a media access control (MAC) algorithm containing two modes, and a method for using the same. Specifically, the present invention relates to a MAC algorithm with separate operation modes for good channel and bad channel communication in a communication network, such as a wireless ad-hoc communication network. In each mode, the MAC algorithm is configured to vary operational parameters, including channel vector values transmitted in request-to-send/clear-to-send (RTS/CTS) messages, depending on the channel mode indicated.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications network known as an "ad-hoc" network has been developed for use by the military. In this type of network, each mobile node is capable of operating as a base station or router for other mobile nodes, thereby eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and communicate with other mobile nodes, such as those on the public switched telephone network (PSTN), and on other networks, such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

Communication between nodes, however, is often subject to interference and transmission errors. To minimize the occurrence of erroneous data, receivers and transmitters may be configured to detect transmission errors in a number of ways and if detected, request retransmissions. For instance, a data transmission system between nodes may include an automatic repeat request (ARQ) transmitter and receiver, each adapted to use an error correction code. As may be appreciated by one skilled in the art, the ARQ transmitter may be used to include error detection codes in the transmission data stream to a remote receiver. The ARQ receiver may then be used to detect errors in the data stream using such codes and request retransmission from the transmitter. Further details of ARQ application and use of error detection codes may be found in U.S. Pat. No. 5,629,948 to Hagiwara et al., and in U.S. Pat. No. 5,784,362 to Turina, the entire content of each being incorporated herein by reference. The selective use of ARQ with a sliding window transport mechanism is also discussed in U.S. Pat. No. 5,717,689 to Ayanoglu, and still another ARQ retransmission technique using a "go-back-n" ARQ command is discussed in U.S. Pat. No. 4,726,027 to Nakamura et al., the entire content of each being incorporated herein by reference.

However, ARQ media access control (MAC) for ad-hoc networks encounter several difficulties. As known to those skilled in the art, data packet collisions can occur if transmissions overlap. In such cases, an ACK will not be received and both packets must be retransmitted. As noted in an article by Garcia-Luna-Aceves et al., entitled "Reversing The Collision-Avoidance Handshake In Wireless Networks", the entire content of which being incorporated herein by reference, one solution to packet collisions involves split-channel reservation multiple access (SRMA) wherein a node requiring to transmit data to a receiver first sends a request-to-send (RTS) packet to the receiver, who responds with a clear-to-send (CTS) packet if it receives the RTS correctly. However, multichannel MAC design, which is basically an extension of multiple access with collision avoidance (MACA) algorithm, typically cannot efficiently handle such ARQ functions. Additional details of the MACA algorithm is presented in an article by Phil Karn, entitled "MACA-A New Channel Access Method For Packet Radio", and in an article by Tang et al., entitled "Collision-Avoidance Transmission Scheduling For Ad-Hoc Networks", the entire content of each being incorporated herein by reference.

Where retransmissions are required, the MACA algorithm handles ARQ by repeating the whole request to send/clear to send channel access sequence. This includes transmission of an entire channel vector, equal to the length of channel reservation. This is inefficient in some channel conditions due to fact that resend will happen with a very high probability. Accordingly, a need exists for an ARQ MAC that can handle ARQ segment retransmissions more efficiently.

SUMMARY OF THE INVENTION

An object of the present invention is to provide a system and method of media access control (MAC) which handles ARQ segment retransmissions more efficiently in ad-hoc communication networks.

Another object of the present invention is to provide a system and method for estimating a channel vector length is a first mode of operation, and communicating the length to a first group of nodes for use in RTS/CTS sequences.

Another object of the present invention is to provide a system and method for monitoring a data channel to determine an actual channel vector length, and communicating the actual length to a first group of nodes for use in RTS/CTS sequences.

Still another object of the present invention is to provide a system and method for a second mode of operation, wherein the true channel vector is communicated to a first group of nodes for use in RTS/CTS sequences.

These and other objects are substantially achieved by providing a system and method for a MAC algorithm with separate operation modes. Individual operation modes can be created based on channel specifics, including a separate mode for good channel and bad channel communication. For each mode, channel vector values transmitted during collision avoidance operations, such as in an exchange of request-to-send/clear-to-send (RTS/CTS) messages, are varied depending on channel mode, thus resulting in optimized system throughput.

In a first mode, the present invention provides a system and method to estimate a channel vector length, and communicate the length to a first node, and an associated group of nodes receiving the RTS/CTS sequence. Each node then maintains this channel length for use in their own RTS/CTS sequences. Additionally, the data channel is monitored in the case of bad channels, to determine an actual channel vector length by monitoring partial and complete acknowledgement (ACK) messages. Once the actual channel vector length is determined, it can be communicated to the associated group of nodes directly, in the case of individual RTS/CTS sequences, or as a group, in the case where the nodes monitor adjacent RTS/CTS sequences. In a second mode, a maximum channel vector length is used, as retransmissions are less probable in good channels.

Specifically, in good channel operation mode, the true channel vector is communicated in the RTS/CTS and used. In bad channel operation mode, the estimated channel vector is communicated in the RTS/CTS and used, however the data channel is monitored for partial and complete ACK messages to detect the actual channel vector. This actual channel vector is then communicated in the RTS/CTS and used, and provided to other nodes to update channel vector information.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
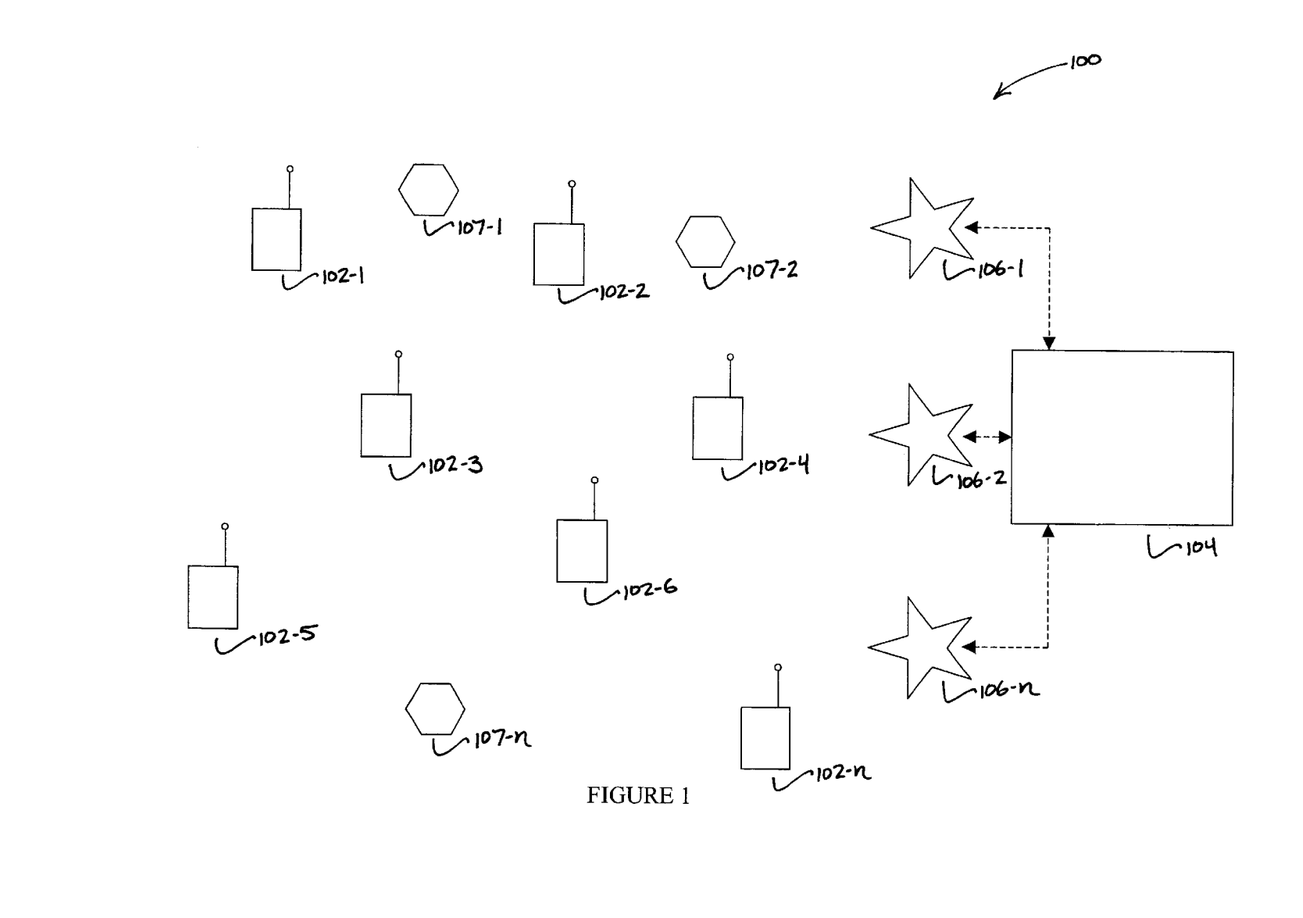
FIG. 1 is a block diagram of an example ad-hoc packet switched wireless communications network including a plurality of nodes in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-$n$ (referred to generally as nodes 102 or mobile nodes 102), and can, but is not required to, include a fixed network 104 having a plurality of access points 106-1, 106-2, . . . 106-$n$ (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 may also include a plurality of fixed routers 107-1 through 107-$n$ (referred to generally as nodes 107 or routers 107) for routing data packets between other nodes 102, 106 or 107. It is noted that for purposes of this discussion, the nodes discussed above can be collectively referred to as "nodes 102, 106 and 107", or simply "nodes" or "terminals". As can be appreciated by one skilled in the art, the nodes 102, 106 and 107 are capable of communicating with each other directly, or via one or more other nodes operating as routers for packets being sent between nodes, as described in U.S. Pat. No. 5,943,322 to Mayor, and in U.S. patent application Ser. Nos. 09/897,790, 09/815,157 and 09/815,164, referenced above.

Figure 2:
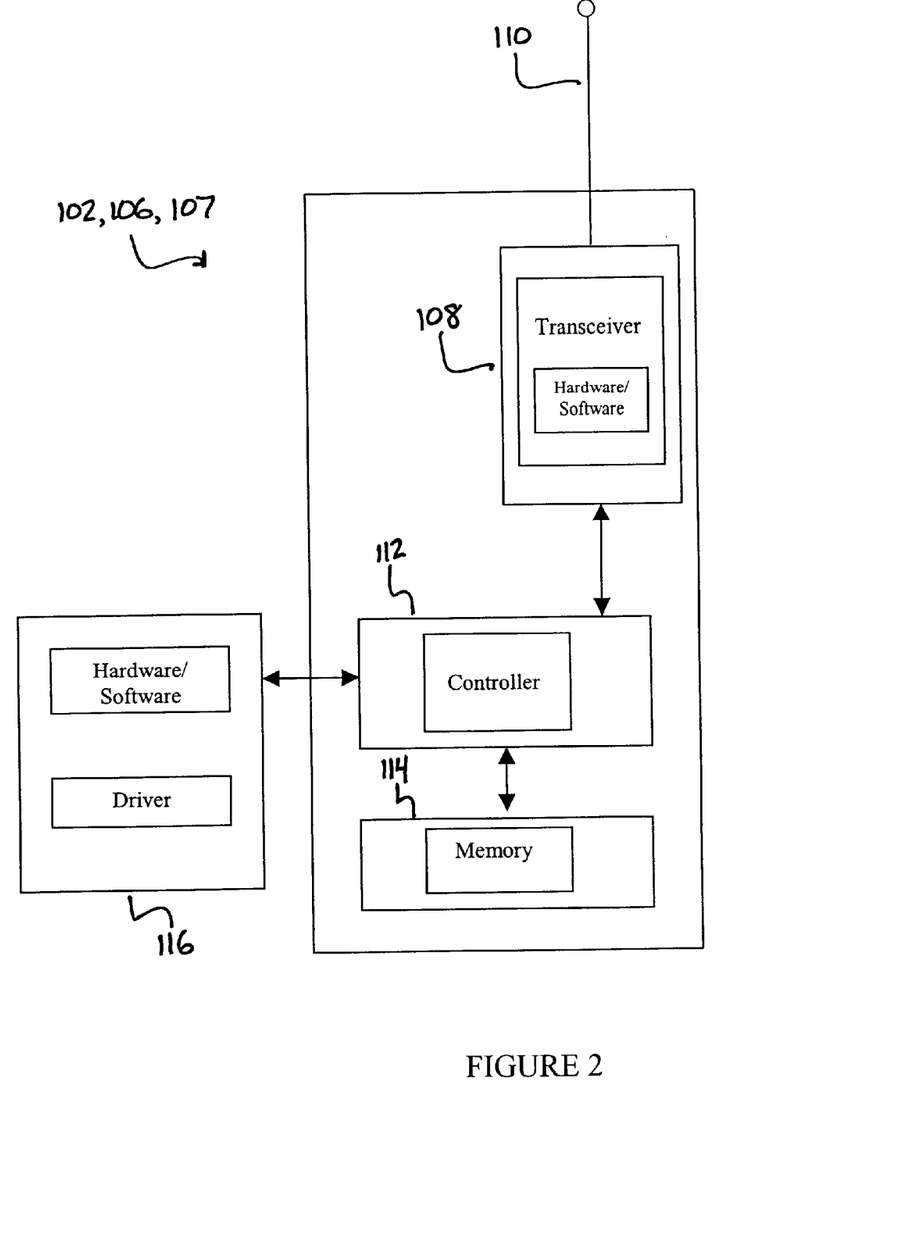
FIG. 2 is a block diagram illustrating an example of a mobile node employed in the network shown in FIG. 1.

As shown in FIG. 2, each node 102, 106 and 107 includes a transceiver 108 which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node routing and update information.

Each node 102, 106 and 107 further includes a memory 114, such as a random access memory (RAM), that is capable of storing, among other things, routing information pertaining to itself and other nodes in the network. The nodes 102, 106 and 107 periodically exchange respective routing information, referred to as routing advertisements, with each other via a broadcasting mechanism at various intervals, such as when a new node enters the network, or when existing nodes in the network move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software to perform automatic repeat request (ARQ) functions and media access control (MAC), as set forth in greater detail below.

As stated earlier, multichannel MAC design typically cannot efficiently handle ARQ functions. To implement ARQ MAC for ad-hoc networks in accordance with an embodiment of the present invention, the transmitter 108 of a node 102, 106 or 107 may be directed to output a bit stream of transmission data, which are then given to a ARQ transmitter. At the ARQ transmitter, or transceiver, error detection codes are attached to the transmission data and resulting transmission signals in the ARQ segments are transmitted to an ARQ receiver on a reception side via a transmission path. At the ARQ receiver, the presence of an error is checked for each segment of the received signals, and a re-transmission request signal is transmitted to the ARQ transmitter whenever an error is detected. When no errors are detected in the received signals, the ARQ receiver, or transceiver, outputs the received data to a reception side data terminal and transmits a successful reception signal, an acknowledgment (ACK) message, to the ARQ transmitter. However, multiple modes of operation to achieve this result can be implemented depending on channel characteristics and the probability of retransmissions.

To achieve this in accordance with an embodiment of the present invention, the transceiver 108 of a node, such as nodes 102, 106 and 107 of FIG. 1, is directed to send a media access control protocol data unit (MPDU) as a stream of segments to a receiving node. Each segment contains forward error correction (FEC) and error detection, for example, Viterbi encoding for FEC, and cyclic redundancy check (CRC) error detection. As described above, at the ARQ receiver, the presence of an error is checked for each segment of the received signals, and a re-transmission request signal is transmitted to the ARQ transmitter whenever an error is detected.

When no errors are detected in the received signals, a transmitter associated with the ARQ receiver, such as a transceiver in which the receiver can be included, outputs the received data to a reception side data terminal and transmits an ACK message to the ARQ transmitter. The ACK message can be provided upon completion of all segments, or partial segments. At the receiving node, if a segment has errors after FEC has been performed and the segment has no information to locate errors, the entire segment or partial segment has to be retransmitted.

As described above, each segment can be transmitted as a physical layer packet, each of which has parity and forward error correcting coding. A parity code is used to verify correctness of the data in the segment, and segments that fail parity check are discarded by receiver. An acknowledgement (ACK) of successful reception is sent by the receiving node 102, 106 or 107 only after all the segments or partial segments in the MPDU are received correctly. A negative acknowledgement (NACK) is sent in the event of failed or erroneous segment reception, such as when a packet collision occurs.

As noted above, collision avoidance can be achieved using a control-signal handshake between transmitting and receiving nodes. The multiple access with collision avoidance (MACA) protocol of the present embodiment uses such a handshake technique between nodes consisting of a request-to-send (RTS) control packet sent from a source node to a destination node which in response, replies with a clear-to-send (CTS) control packet. However, typically a MACA algorithm handles ARQ retransmissions by repeating the whole request-to-send/clear-to-send (RTS/CTS) channel access sequence. The embodiment of the present invention described below discloses a MACA algorithm containing multiple modes, such as a first mode of operation for good communication channels and a second mode for bad channels. These modes optimize system throughput in different channel conditions. As known to those skilled in the art, channel conditions can vary between "good" and "bad" depending upon factors such as interference from other users, radio propagation, noise and fading due to multipath and high mobility. One example of a bad channel is when average nonfade period (ANFP) is smaller, or of the same duration, as one transmitted segment.

Figure 3:
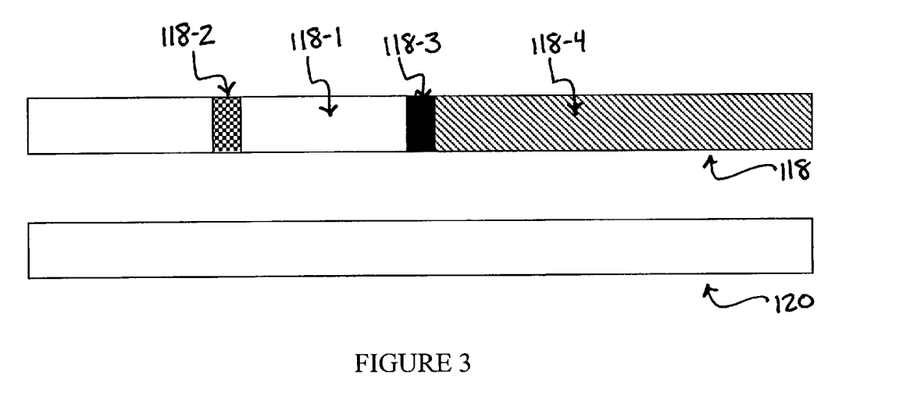
FIG. 3 is a slot diagram illustrating an example of a channel and channel vector used by nodes in the network shown in FIG. 1 in accordance with an embodiment of the present invention.

In each mode, the channel vector, or segment stream, monitored for ACK/NACK messages is adjusted based upon a probability of retransmission. For example, in good channel mode, where there are lower probabilities of retransmission, the channel vector transmitted in RTS/CTS is the true channel vector, or true length of channel reservation. This can be indicated by a bit in RTS/CTS messages. In bad channel mode, where there are higher probabilities of retransmission occurring, the channel vector transmitted in RTS/CTS is an estimate of the maximum length and actual communication can be shorter. FIG. 3 illustrates channels in a first and second mode of operation in accordance with an embodiment of the present invention.

FIG. 3 is a slot diagram illustrating an example of a channel and channel vector used by nodes in the network shown in FIG. 1 in accordance with an embodiment of the present invention. Channel 118 and 120 of FIG. 3 represent channels used in communications between nodes in a network, such as network 100 of FIG. 1. Each channel is occupied by a stream of data segments during communication, and each channel vector represents a set number of segments. Channel 120 represents a maximum channel vector, based on estimated retransmissions of segments in the channel. This value is announced in RTS/CTS messages between nodes. Channel 118 represents an actual channel vector determined by monitoring the data channel through the use of the present embodiment. The two modes of operation can be described using the channel illustration of FIG. 3.

In channel 118 of FIG. 3, a first mode is shown applied to a representative bad channel, where there are higher probabilities of retransmission occurring. A channel vector 118-1, comprising a series of segments transmitted in the RTS/CTS sequence, is based on an estimate of the maximum channel vector length including retransmissions. The embodiment of the present invention directs the communicating nodes to monitor the data channel for either partial segment ACK or all segments good ACK messages, which serve to define the actual channel vector length. In this case, the channel vector 118-1 can be shorter than the maximum channel vector. The vector length is defined by partial segment ACK messages in the channel, such as 118-2, and all segments good ACK messages. Therefore the channel vector is shorter, resulting in a time savings shown as the channel duration 118-4. For a representative good channel, where there are lower probabilities of retransmission, the channel vector transmitted in the RTS/CTS sequence is the true channel vector, or true length of channel reservation and this can be indicated by a bit in RTS/CTS messages. As the probability of retransmission is low, a longer channel vector has less impact.

In the channels of FIG. 3, maximum estimated channel vector value is used if a source knows that a channel is difficult and retransmissions are probable. The maximum channel vector is announced in the RTS/CTS based on the estimated retransmission of segments in the channel. Retransmissions can be done without accessing the control channel as long as the channel is reserved. Other terminals in the network have to use estimated maximum channel vector or, they can get real channel values by monitoring the data channel. This allows, for example, a "multi-headed IAP" to be able to obtain real channel vector values by receiving all the channels and being able to capture all successful segment acknowledgement (ACK) messages in the data channel.

If an intelligent access point (IAP) 106 or wireless router (WR) 107 of FIG. 1, which can monitor data ACK messages in all channels, sends an RTS to a terminal, such as a node 102 which cannot monitor all channels, the node may update the maximum channel vectors based on information that the IAP provides in the RTS packet. The IAP may need to associate information that the node can use to verify that the IAP/WR has information equaling, either heard or transmitted, all segment good ACK messages indicating that the channel vector was shorter than the announced maximum value.

One way to achieve this in accordance with an embodiment of the present invention, is to compute the checksum of addresses of a node marked as having a maximum vector in a channel that is announced free by the IAP. This checksum, transmitted in an RTS packet, can be used by the node to verify that the address entry in the IAP/WR channel monitoring table is the same entry the node has in it's table. If not, the node can modify the channel vector information to a correct value.

If a terminal has a channel vector to a 48 bit MAC address, aa.bb.cc.dd.ee.ff, where each letter is 4 bits, then this entry has to be compressed so that it can fit in the RTS. The RTS can not be long as length increases control channel usage and increases the amount of access collisions. Checksum is just an example of a function a=F(MAC address) that is computed in transmit and receive and can be used to verify that the channel is ready. For example, when terminal A sends a packet to terminal B, and terminal A knows that terminal C, who transmitted previous RTS, has finished communication earlier than it announced in RTS, then terminal A sends RTS packet to terminal B with a=F(MAC address of C), as channel vector is reserved for communication by terminal C. Terminal B computes a=F(MAC address of terminal that reserved channel proposed in RTS) and compares that to the transmission by terminal A. If it matches, then terminal B knows that terminal A knows more about the channel than B and can continue and respond with CTS. A checksum function is presented as an example, however any suitable function can be used for this purpose.

FIGS. 4A–4E are diagrams illustrating an example of a communication between nodes in the network shown in FIG. 1 performed in accordance with an embodiment of the present invention. FIGS. 4A–4E illustrate several nodes of network 100 in FIG. 1 during communication. The network 100-1 of FIG. 4A includes an intelligent access point (IAP) 106 in communication with nodes 102-1, 102-2, 102-3 and 102-4, however any number of nodes 102, 106 and 107 of FIG. 1 can be included. Specifically, FIGS. 4A–4E illustrate the communication of four nodes with an IAP when there are hidden nodes in the network (not shown).

The communication between nodes, implementing an RTS/CTS sequence in accordance with an embodiment of the present invention, is shown in a series of communications. In a first communication shown in FIG. 4A, the IAP 106 at the center of the network 100-1 receives request-to-send (RTS) messages with estimated channel vectors with one retransmission from node 102-1. The estimated length of the communication in this channel "A" is 2 (transmission+retransmission), however, any estimated length may be considered, as this is presented as one example.

Figure 4A:
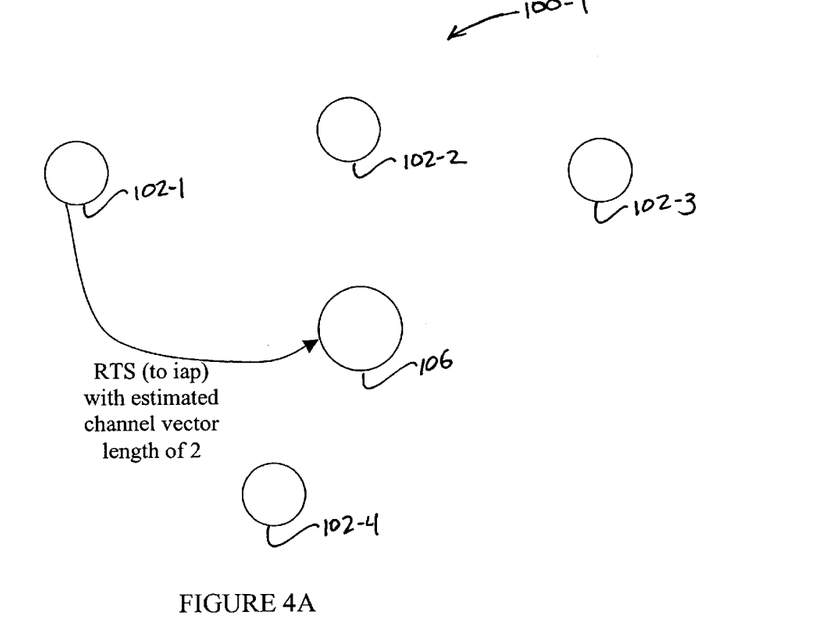
FIGS. 4A–4E are diagrams illustrating an example of a communication between nodes in a network as shown in FIG. 1 performed in accordance with an embodiment of the present invention.
Figure 4B:
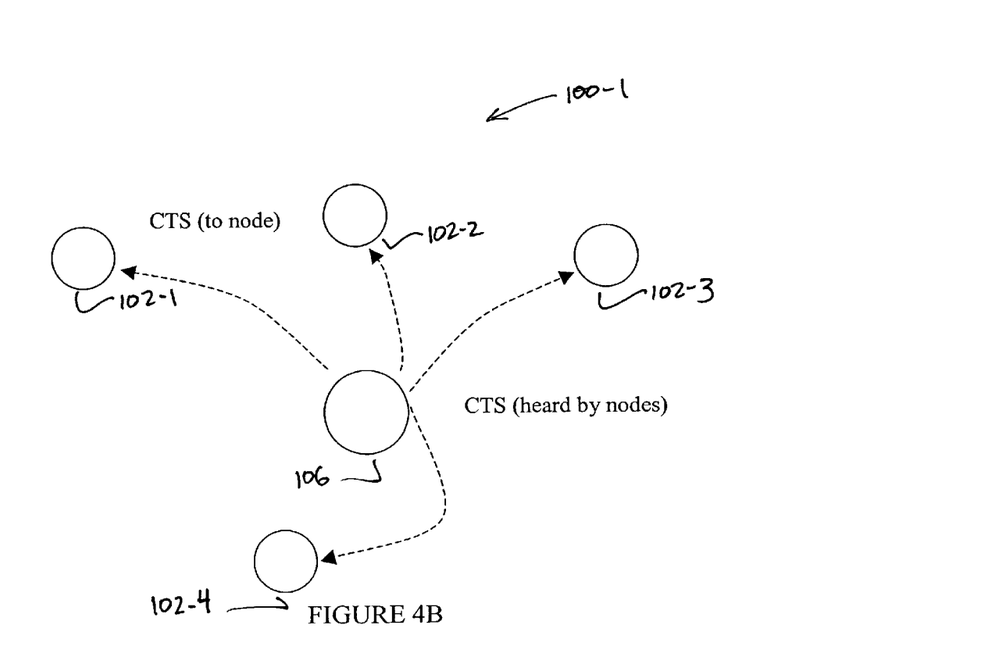
Figure 4C:
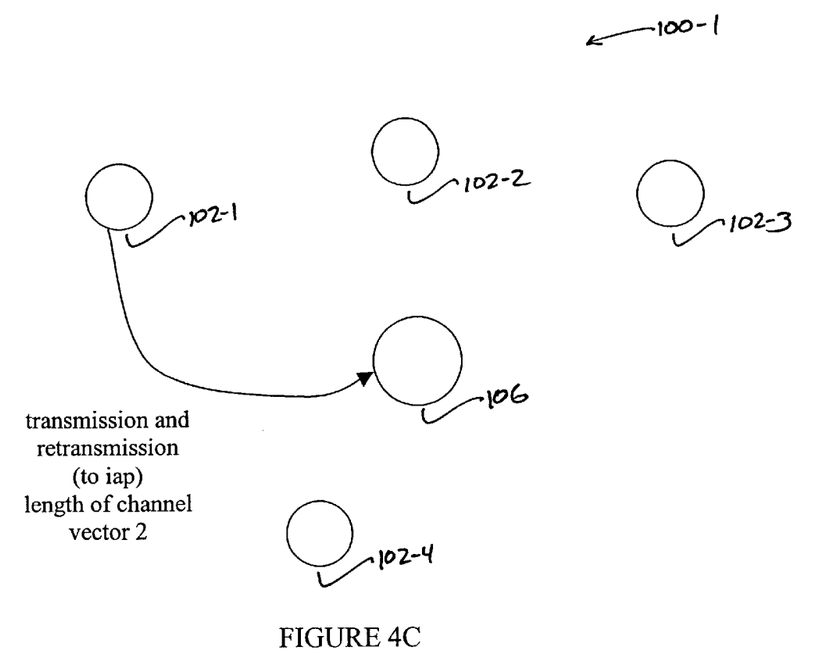
Figure 4D:
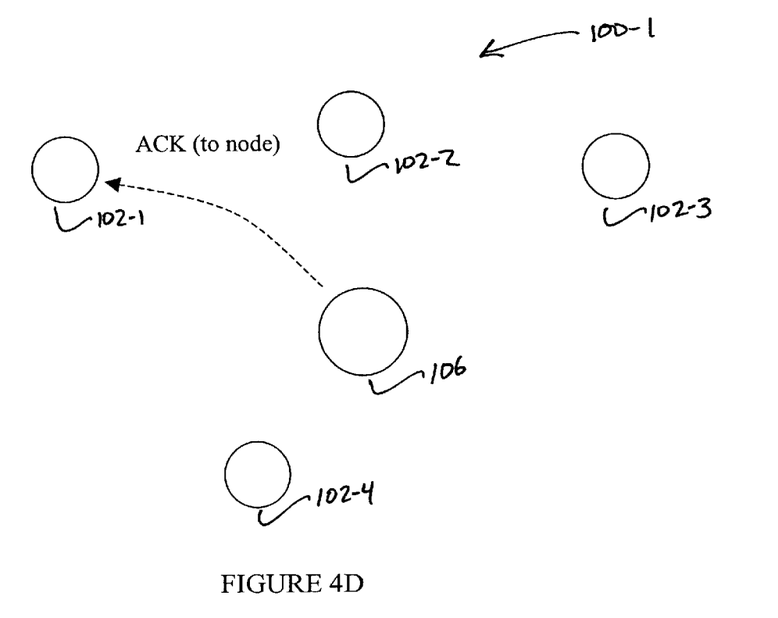

In FIG. 4B, the IAP responds to the RTS message with a CTS message that can be heard by all nodes within the IAP's broadcast range. As shown in FIG. 4C, node 102-1 transmits a data stream to the IAP 106 in response to receipt of the CTS message. Upon successful completion of transmission and any retransmissions, the IAP 106 sends an all segments good ACK message to node 102-1 in FIG. 4D. In this communication, nodes 102-2, 102-3 and 102-4 do not monitor the data channel, and each thinks that channel vector "A" is reserved for a vector length of 2 based on the CTS message provided by the IAP to node 102-1 which is heard by each node 102-1, 102-2, 102-3 and 102-4. However, the IAP 106 (and any remaining nodes configured to do so) monitors the data channel and determines an actual channel vector length for channel "A".

Figure 4E:
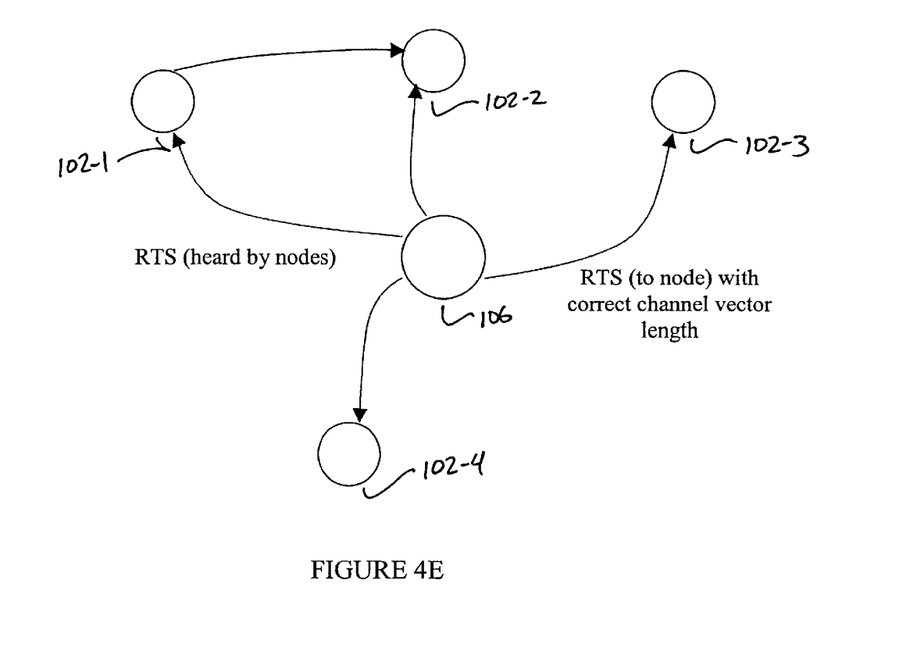

After communicating with node 102-1, the IAP can move to another node as shown in FIG. 4E, such as node 102-3, and transmit an RTS message to node 102-3 and specify that channel "A" is free and a checksum for address of node 102-1. Node 102-3 compares the checksum and verifies that the channel is free and the checksum matches the address of the node that is marked as using the channel. This can be repeated for each node of network 100-1.

In a second embodiment of the present invention, each node can verify information received regarding the maximum channel vector is from the same IAP address from which a free channel message is received. The same operation can be done by nodes 102-2 and 102-4 if each are monitoring the control channel when they hear the RTS message as nbr RTS.

The node communication works the same way in examples in which the IAP transmits data frames. In this case, the IAP receives the all segments good ACK message and can then transmit RTS or CTS messages with the channel marked as free based on channel monitoring.

The embodiment of the present invention described above reduces the overhead of retransmissions by having retransmissions contained in a data channel. Furthermore, the new media access control described above operates efficiently in both good and bad channel conditions due to operation capabilities in two modes. The embodiment is very efficient when communicating with multi-headed infrastructures and serves to reduce maximum time to deliver a MPDU in a fading channel.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined.

What is claimed is:

1. A method for establishing channel vector length in communications between nodes in an ad-hoc communications network, said network including a plurality of nodes being adapted to transmit and receive signals to and from other nodes in said network, the method comprising:

estimating a channel vector length of a message being communicated via a first data channel;

communicating said estimated channel vector length to at least one node of said plurality;

controlling said at least one node to communicate said estimated channel vector length to a first group of nodes of said plurality;

controlling said at least one node to monitor said data channel and calculate an actual channel vector length based on said monitored data channel; and controlling said at least one node to communicate said actual channel vector length to said first group of nodes of said plurality.

2. A method as claimed in claim 1, wherein:

said communication of said estimated channel vector length is a first mode of operation for said data channel, wherein said communication via said data channel is subject to a substantial number of retransmissions.

3. A method as claimed in claim 1, wherein said estimating said channel vector length comprises:

controlling a node to estimate said channel vector length based on an expected number of transmitted segments and an expected number of retransmitted segments for said communication.

4. A method as claimed in claim 1, wherein said communicating said estimated channel vector length comprises:

controlling said at least one node to communicate said estimated channel vector length to said at least one node as part of a request to send (RTS) message.

5. A method as claimed in claim 1, wherein said communicating said estimated channel vector length comprises:

controlling said at least one node to communicate said estimated channel vector length to said first group of nodes as part of a clear to send (CTS) message.

6. A method as claimed in claim 1, wherein said monitoring said data channel comprises:

controlling said at least one node to monitor said data channel to detect at least one of a partial segment acknowledgement (ACK) message and an all segments good acknowledgement (ACK) message.

7. A method as claimed in claim 6, wherein said calculating said actual channel vector length comprises:

controlling said at least one node to calculate an actual channel vector length based on said detected at least one of a partial segment acknowledgement (ACK) message and an all segments good acknowledgement (ACK) message.

8. A method as claimed in claim 1, wherein said communicating said actual channel vector length comprises:

controlling said at least one node to communicate said actual channel vector length to said first group of nodes of said plurality as part of a request to send (RTS) message.

9. A method as claimed in claim 1, further comprising:

controlling said at least one node to calculate a checksum for a first node of said plurality; and communicating said checksum to a second node of said plurality as part of a request to send (RTS) message.

10. A method as claimed in claim 9, further comprising:

controlling said second node to update a channel vector database at said second node based on said RTS message.

11. A method as claimed in claim 1, further comprising:

controlling said at least one node to communicate a maximum channel vector length to said first group of nodes as part of at least one of a clear to send (CTS) and request to send (RTS) message.

12. A method as claimed in claim 11, wherein:

said communication of said maximum channel vector length is a second mode of operation for said data channel, wherein said communication via said data channel is subject to a minimal number of retransmissions.

13. A system for establishing channel vector length in communications between nodes in an ad-hoc communications network, said network including a plurality of nodes being adapted to transmit and receive signals to and from other nodes in said network, the system comprising:

a first node, adapted to estimate a channel vector length of a message being communicated via a first data channel, and to communicate said estimated channel vector length to at least one node of said plurality;

said at least one node, adapted to communicate said estimated channel vector length to a first group of nodes of said plurality;

said at least one node being further adapted to monitor said data channel and to calculate an actual channel vector length based on said monitored data channel; and said at least one node being further adapted to communicate said actual channel vector length to said first group of nodes of said plurality.

14. A system as claimed in claim 13, wherein:

said communication of said estimated channel vector length is a first mode of operation for said data channel, wherein said communication via said data channel is subject to a substantial number of retransmissions.

15. A system as claimed in claim 13, wherein:

said first node is adapted to estimate said channel vector length based on an expected number of transmitted segments and an expected number of retransmitted segments for said communication.

16. A system as claimed in claim 13, wherein:

said first node is adapted to communicate said estimated channel vector length to said at least one node as part of a request to send (RTS) message.

17. A system as claimed in claim 13, wherein:

said at least one node is adapted to communicate said estimated channel vector length to said first group of nodes as part of a clear to send (CTS) message.

18. A system as claimed in claim 13, wherein:

said at least one node is adapted to monitor said data channel to detect at least one of a partial segment acknowledgement (ACK) message and an all segments good acknowledgement (ACK) message.

19. A system as claimed in claim 18, wherein:

said at least one node is adapted to calculate an actual channel vector length based on said detected at least one of a partial segment acknowledgement (ACK) message and an all segments good acknowledgement (ACK) message.

20. A system as claimed in claim 13, wherein:

said at least one node is adapted to communicate said actual channel vector length to said first group of nodes of said plurality as part of a request to send (RTS) message.

21. A system as claimed in claim 13, wherein:

said at least one node is adapted to calculate a checksum for said first node of said plurality and communicate said checksum to a second node of said plurality as part of a request to send (RTS) message.

22. A system as claimed in claim 21, wherein:

said second node is adapted to update a channel vector database at said second node based on said RTS message.

23. A system as claimed in claim 13, wherein:

said at least one node is adapted to communicate a maximum channel vector length to said first group of nodes as part of at least one of a clear to send (CTS) and request to send (RTS) message.

24. A system as claimed in claim 23, wherein:

said communication of said maximum channel vector length is a second mode of operation for said data channel, wherein said communication via said data channel is subject to a minimal number of retransmissions.

25. A computer-readable medium of instructions, adapted to establish channel vector length in communications between nodes in an ad-hoc communications network, said network including a plurality of nodes being adapted to transmit and receive signals to and from other nodes in said network, comprising:

a first set of instructions, adapted to estimate a channel vector length of a message being communicated via a first data channel, and to communicate said estimated channel vector length to at least one node of said plurality;

a second set of instructions, adapted to control said at least one node to communicate said estimated channel vector length to a first group of nodes of said plurality;

a third set of instructions, adapted to control said at least one node to monitor said data channel and to calculate an actual channel vector length based on said monitored data channel; and a fourth set of instructions, adapted to control said at least one node to communicate said actual channel vector length to said first group of nodes of said plurality.

26. A computer-readable medium of instructions as claimed in claim 25, wherein:

said communication of said estimated channel vector length is a first mode of operation for said data channel, wherein said communication via said data channel is subject to a substantial number of retransmissions.

27. A computer-readable medium of instructions as claimed in claim 25, wherein:

said first set of instructions is adapted to estimate said channel vector length based on an expected number of transmitted segments and an expected number of retransmitted segments for said communication.

28. A computer-readable medium of instructions as claimed in claim 25, wherein:

said first set of instructions is adapted to communicate said estimated channel vector length to said at least one node as part of a request to send (RTS) message.

29. A computer-readable medium of instructions as claimed in claim 25, wherein:

said second set of instructions is adapted to control said at least one node to communicate said estimated channel vector length to said first group of nodes as part of a clear to send (CTS) message.

30. A computer-readable medium of instructions as claimed in claim 25, wherein:

said third set of instructions is adapted to control said at least one node to monitor said data channel to detect at least one of a partial segment acknowledgement (ACK) message and an all segments good acknowledgement (ACK) message.

31. A computer-readable medium of instructions as claimed in claim 30, wherein:

said third set of instructions is adapted to control said at least one node to calculate an actual channel vector length based on said detected at least one of a partial segment acknowledgement (ACK) message and an all segments good acknowledgement (ACK) message.

32. A computer-readable medium of instructions as claimed in claim 25, wherein:

said fourth set of instructions is adapted to control said at least one node to communicate said actual channel vector length to said first group of nodes of said plurality as part of a request to send (RTS) message.

33. A computer-readable medium of instructions as claimed in claim 25, further comprising:

a fifth set of instructions, adapted to control said at least one node to calculate a checksum for a first node of said plurality and to communicate said checksum to a second node of said plurality as part of a request to send (RTS) message.

34. A computer-readable medium of instructions as claimed in claim 33, further comprising:

a sixth set of instructions, adapted to control said second node to update a channel vector database at said second node based on said RTS message.

35. A computer-readable medium of instructions as claimed in claim 25, wherein:

said second set of instructions is adapted to control said at least one node to communicate a maximum channel vector length to said first group of nodes as part of at least one of a clear to send (CTS) and request to send (RTS) message.

36. A computer-readable medium of instructions as claimed in claim 35, wherein:

said communication of said maximum channel vector length is a second mode of operation for said data channel, wherein said communication via said data channel is subject to a minimal number of retransmissions.

* * * * *